United States Patent Office 3,013,070
Patented Dec. 12, 1961

3,013,070
PROCESS FOR THE PRODUCTION OF BUTANE-1,2,4-TRICARBOXYLIC ACID
Bruno Blaser, Dusseldorf-Urdenbach, and Hubert Schirp, Dusseldorf, Germany, assignors to Henkel & Cie. G.m.b.H., Dusseldorf-Henkelstrasse, Germany, a corporation of Germany
No Drawing. Filed Apr. 11, 1955, Ser. No. 500,672
Claims priority, application Germany Apr. 14, 1954
2 Claims. (Cl. 260—537)

This invention relates to a process for the production of butane-1,2,4-tricarboxylic acid, and more particularly to a process for producing said acid from hexahydro-p-hydroxy-benzoic acid or 4-keto-hexahydrobenzoic acid, or their esters.

We have found that butane-1,2,4-tricarboxylic acid can be produced in a very simple fashion and with very good yields by oxidizing hexahydro-p-hydroxy-benzoic acid or its esters with a strong oxidizing agent. In the transformation of hexahydro-p-hydroxy-benzoic acid into butane-1,2,4-tricarboxylic acid, 4-keto-hexahydro-benzoic acid is formed as an intermediate reaction product. Hence, 4-keto-hexahydrobenzoic acid or its esters can also serve as the starting material for the production of butane-1,2,4-tricarboxylic acid in accordance with the present invention.

The transformation of hexahydro-p-hydroxy-benzoic acid or 4-keto-hexahydrobenzoic acid to butane-1,2,4-tricarboxylic acid may be carried out with the aid of any suitable strong oxidizing agent. For example, nitric acid has been found to produce particularly good yields. However, other inorganic oxidizing agents, such as potassium permanganate, will also produce good yields of the tricarboxylic acid. Other strong oxidizing agents may also be used.

The above-described oxidation reaction can be carried out without a catalyst or in the presence of a catalyst. However, we have found that the presence of ammonium vanadate as a catalyst has a particularly favorable influence upon the rapidity of the reaction and the yields produced.

The most favorable reaction temperature varies from one oxidizing agent to the other. For example, if nitric acid is used as an oxidizing agent, we have found that at temperatures below 65° C. the oxidation is too weak to produce appreciable amounts of tricarboxylic acid; and conversely, we have found that at temperatures above 100° C., the reactants and their products readily decompose, so that the amounts of tricarboxylic acid formed are also very small. Hence, in the case of nitric acid, the most favorable range of reaction temperatures is from about 65° C. to about 100° C.

In the case of potassium permanganate as the oxidizing agent, the most advantageous range of reaction temperatures is from −5° C. to +25° C.

In general, the concentration of the oxidizing agent in the reaction mixture should be rather high. For example, if the oxidizing agent is nitric acid, the concentration should not be allowed to drop below 60% during the oxidation reaction. We have found, however, that it is more advantageous to start with a concentration of 60-65% nitric acid and to add more nitric acid to the reaction mixture periodically so as to maintain the concentration at a value between 60 and 65% as the oxidizing agent is used up, rather than to supply the entire amount of nitric acid needed over and above the minimum concentration of 60% at the beginning of the oxidation reaction.

The reaction product obtained in accordance with the present invention can be separated and purified by first evaporating the reaction mixture to drive off the nitric acid, then dissolving the residue in ethyl acetate, and finally crystallizing out the butane-1,2,4-tricarboxylic acid by slowly adding petroleum ether to the ethyl acetate solution. The relatively pure product can then be recovered by simple filtration.

Another method of recovering butane-1,2,4-tricarboxylic acid from the reaction mass comprises first evaporating the nitric acid, then esterifying the raw product with lower aliphatic alcohols, such as, for example, methyl or ethyl alcohol, and finally recovering the ester by fractional distillation. The ester may then be re-transformed into the free tricarboxylic acid by well known methods.

When potassium permanganate is used as the oxidizing agent, the separation of the reaction product from the reaction mass is also very simple. For example, one method comprises first destroying the excess potassium permanganate with alcohol, filtering off the manganese dioxide formed thereby, acidifying the filtrate, evaporating the acid solution to substantial dryness, dissolving the residue in ethyl acetate, and finally slowly adding petroleum ether to the solution to precipitate out the relatively pure butane-1,2,4-tricarboxylic acid. The pure product may then be readily recovered by simple filtration.

Similarly, the reaction product may be separated in the form of a lower aliphatic alcohol ester, by first destroying the excess permanganate, esterifying the raw product with a lower aliphatic alcohol, and finally separating the ester by fractional distillation.

Butane-1,2,4-tricarboxylic acid is useful as a hardening agent for synthetic resins and as an intermediate product in the manufacture of various organic compounds, particularly of softeners and synthetic resins.

The following examples will further illustrate our invention and enable others skilled in the art to understand the invention more completely. We wish it to be understood, however, that our invention is not limited to these examples.

*Example I*

66 gm. of hexahydro-p-hydroxy-benzoic acid ethyl ester were added dropwise to a mixture of 132 gm. of 60% nitric acid, 0.1 gm. powdered copper and 0.1 gm. ammonium vanadate at a temperature of about 70° C., accompanied by vigorous stirring. After the evolution of nitrous gases had ceased, 25 cc. of 65% nitric acid were added to the reaction mixture, and the temperature was slowly increased to 90° C. After the reaction had gone to substantial completion, as evidenced by the cessation of the evolution of nitrous gases, the reaction mixture was evaporated until a viscous syrup remained. The viscous residue was then dissolved in ethyl acetate, the resulting solution was heated on a steam bath, and activated charcoal was added thereto. The solution was then filtered to remove the charcoal and insoluble impurities. Petroleum ether was solwly added to the filtrate, which caused the formation of a crystalline precipitate. The precipitate was filtered off and dried. It was identified to be butane-1,2,4-tricarboxylic acid and had a melting point of 120° C. The yield was 43.5 gm., which is about 60% of the theoretical yield.

*Example II*

80 gm. of hexahydro-p-hydroxy-benzoic acid ethyl ester were added dropwise to 175 gm. of a 60% nitric acid solution at a temperature of 70° C. The temperature of the reaction solution was then gradually increased to 95° C. over a period of about 4 hours. During that time, a total of 90 cc. of concentrated nitric acid was periodically added in small portions to maintain the nitric acid concentration at about 60 to 65%. After the evolution of nitrous gases had ceased, the reaction product was separated and purified as described in Example I. The yield of butane-1,2,4-tricarboxylic acid was 54.1 gm., which is about 65% of the theoretical yield.

*Example III*

The procedures described in Examples I and II were repeated using hexahydro-p-hydroxy-benzoic acid as the starting material instead of the ethyl ester. The oxidation of 15 gm. hexahydro-p-hydroxy-benzoic acid in both cases yielded about 12 gm. butane-1,2,4-tricarboxylic acid, which is about 61% of the theoretical yield.

*Example IV*

65 gm. of hexahydro-p-hydroxy-benzoic acid-n-propyl ester were added to a mixture of 0.1 gm. powdered copper and 0.1 gm. ammonium vanadate. The resulting mixture was then heated to 70° C. Thereafter, 120 gm. of 60% nitric acid were slowly added over a period of about 1¼ hours, accompanied by vigorous stirring. The temperature of the reaction mixture was then increased to 90° C. and 45 gm. of 65% nitric acid were additionally supplied to the reaction mixture. The temperature was maintained between 85 and 90° C. for another hour. Subsequently, the reaction mixture was allowed to cool and was then shaken with chloroform. The solution was evaporated until a syrupy, viscous substance, weighing about 57 gm., was left behind. This substance was dissolved in ethyl acetate and activated charcoal was added to the resulting solution. The solution was filtered, and petroleum ether was slowly added to the filtrate while cooling to about 0° C. A crystalline precipitate separated out which was identified as butane-1,2,4-tricarboxylic acid. The yield was 28.0 gm., which is 42.5% of the theoretical yield.

*Example V*

100 gm. hexahydro-p-hydroxy-benzoic acid ethyl ester were boiled under reflux for about 1 hour with a solution of 39 gm. potassium hydroxide in 500 cc. of water. Thereafter, the resulting solution was cooled to —5° C. and 375 gm. potassium permanganate were added thereto in small portions over a period of 8 hours, accompanied by vigorous stirring. During this period, the temperature of the reaction mass was maintained at about 0° C. and during this period a solution of 30 gm. potassium hydroxide in 500 cc. of water was also added in small portions to the reaction mass. At the end of this period, the mass was stirred for 4 additional hours at substantially room temperature. The excess potassium permanganate was then neutralized by the addition of alcohol, and the solution was filtered to remove the manganese dioxide. The practically colorless filtrate was then acidified with hydrochloric acid and evaporated until a viscous, syrupy mass remained. The residue was dissolved in ethyl acetate and the resulting solution was filtered to remove insoluble inorganic salts. The filtrate was cooled to about 0° C. and petroleum ether was slowly added. A crystalline precipitate was formed which was identified as butane-1,2,4-tricarboxylic acid. The yield was 61.2 gm., which is 46.3% of the theoretical yield.

While we have given certain examples of specific embodiments of the present invention, we wish it to be understood that various changes and modifications may be made therein without departing from the spirit of our invention or the scope of the appended claims.

We claim:

1. A process for the production of butane-1,2,4-tricarboxylic acid which comprises reacting a compound selected from the group consisting of hexahydro-p-hydroxy benzoic acid, 4-keto-hexahydrobenzoic acid and their lower alkyl esters with potassium permanganate at a temperature between —5° C. and room temperature.

2. A process for producing butane-1,2,4-tricarboxylic acid which comprises reacting a compound selected from the group consisting of hexahydro-p-hydroxybenzoic acid and its lower alkyl esters with potassium permanganate at a temperature between —5° C. and room temperature, neutralizing the unreacted potassium permanganate with alcohol, filtering off manganese dioxide, acidifying the filtrate, and separating butane-1,2,4-tricarboxylic acid from said acidified filtrate.

References Cited in the file of this patent

UNITED STATES PATENTS

| 1,921,101 | Schrauth | Aug. 8, 1933 |

FOREIGN PATENTS

| 510,638 | Great Britain | Aug. 4, 1939 |